2,922,831

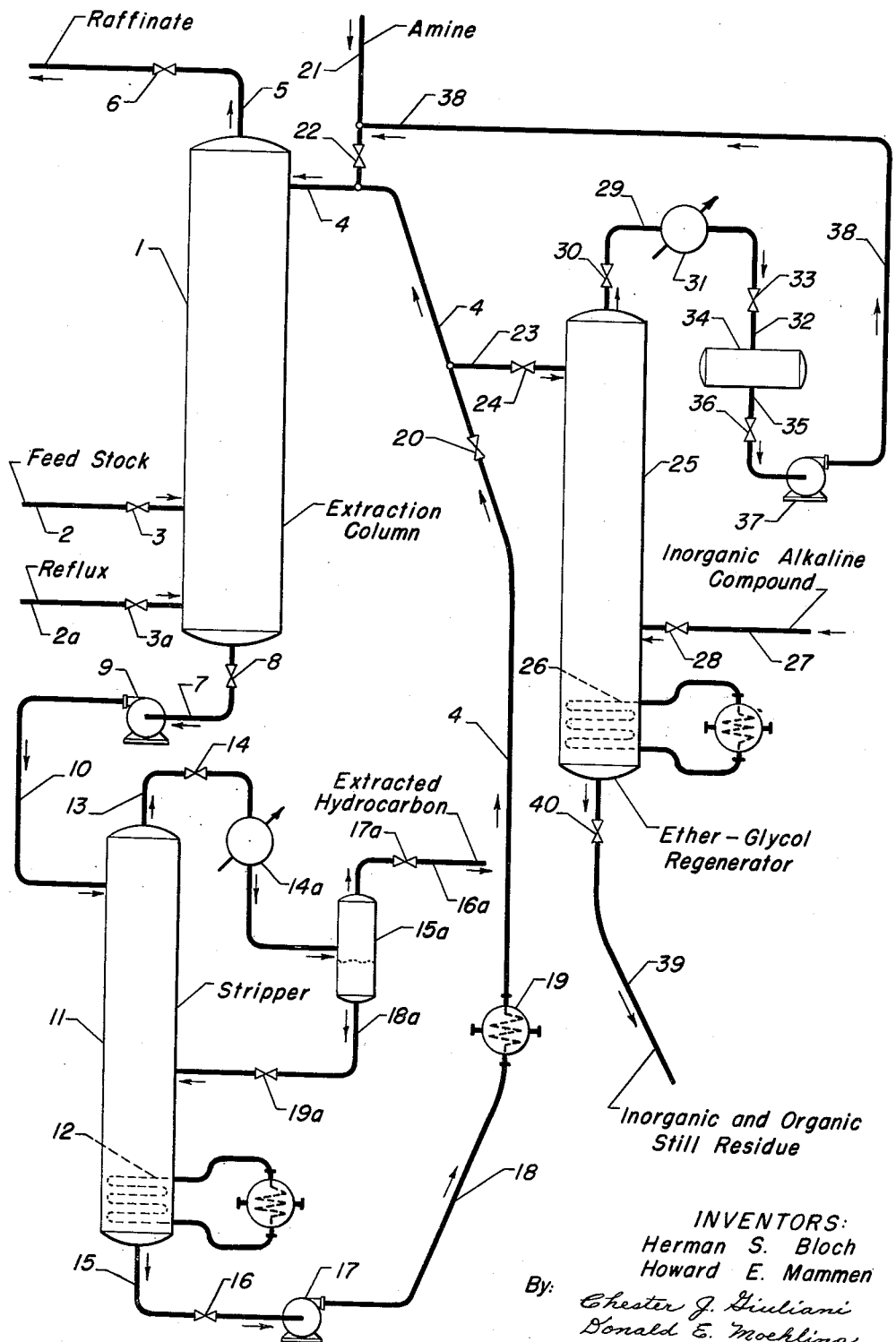

ETHER-GLYCOL REGENERATION PROCESS UTILIZING AN INORGANIC COMPOUND DURING SOLVENT DISTILLATION

Herman S. Bloch, Chicago, and Howard E. Mammen, North Riverside, Ill., assignors, by mesne assignments, to Universal Oil Products Company, Des Plaines, Ill., a corporation of Delaware Application December 23, 1954, Serial No. 477,308

8 Claims. (Cl. 260—705)

This invention relates to a continuous process for regenerating ether-glycols utilized as extracting agents for recovery of certain types of organic compounds from mixtures thereof with other compounds, in which process an amine is utilized in admixture with the ether-glycol to inhibit decomposition and other undesirable changes in the chemical structure or composition of the ether-glycol solvent component. More specifically, this invention concerns a method of distilling the ether-glycol containing the amine inhibitor in the presence of an inorganic alkaline compound which regenerates the amine and frees the glycol for recirculation to the extraction stage of the process.

One object of the invention is to provide an effective and economical method for regenerating ether-glycol solvent extractants whereby both the ether-glycol and the amine inhibitor utilized in admixture therewith to inhibit deterioration of the glycol are recovered for recycling in the process. Another object of the invention is concerned with providing a simple method of recovering ether-glycol extractive solvents from glycol deterioration products which would normally be waste materials in the process under conditions whereby less than 1% of the glycol is removed during each cyclic regeneration of the entire mass or volume of solvent circulated in the system.

In one of its embodiments, the present invention relates to an improvement in continuous solvent extraction processes utilizing a solvent composition in the extraction zone comprising an ether-glycol stabilized against deterioration by the presence of an amino compound dissolved therein, distilling from the resulting rich solvent stream dissolved extract component of the charge stock to be separated and recycling the resulting lean solvent to the extraction zone, said improvement comprising continuously withdrawing from the lean solvent recycle a slip-stream of said lean solvent composition, distilling said slip-stream in the presence of an inorganic alkaline compound and combining the resulting recovered ether-glycol and amine with said recycle stream charged into said extraction zone.

A more specific embodiment of the invention concerns an improvement in continuous solvent extraction processes utilizing a solvent composition in the extraction zone comprising diethylene glycol and from about 2% to about 20% of the resulting composition of water stabilized against deterioration by the presence of an alkanol amine dissolved therein, stripping from the resulting rich solvent stream dissolved extract and recycling the resulting lean solvent composition to the extraction zone, said improvement comprising continuously withdrawing from the lean solvent recycle a slip-stream of said lean solvent composition, distilling said slip-stream at a subatmospheric pressure in the presence of dipotassium phosphate, recovering said diethylene glycol and said alkanol amine as distillate from said distillation step, combining the recovered diethylene glycol and alkanol amine with said recycle solvent stream and withdrawing from said distillation a residue comprising the dipotassium phosphate reaction product of acidic glycol deterioration products formed in said extraction and distillation steps, together with nondistillable residues of said glycol deterioration product.

It is well known in extraction process utilizing ether-glycols of the type hereinafter characterized for the separation of multi-component organic mixtures, such as hydrocarbon mixtures from which the aromatic hydrocarbon component, for example, is recovered, that the ether-glycol tends to undergo gradual deterioration with continued use, presumably because of the tendency of such ether-glycols to undergo oxidation to form acidic deterioration products as well as condensation products having a resinous character. These materials tend to accumulate in the system, due to continuous recycling of the glycol from the extraction zone to the stripping zone and again to the extraction zone. The accumulation of such ether-glycol deterioration products is undesirable in continuous extraction processes, not only because the acidic deterioration products of glycols cause corrosion of the steel equipment utilized for such processes, but resinous materials formed by inter-condensation of such deterioration products precipitate as tarry, insoluble deposits on the interior surfaces of the extraction equipment, reducing heat transfer efficiency and clogging pipelines and valves customarily utilized in such extraction equipment. These undesirable manifestations of ether-glycol deterioration necessitate periodic shutdowns of the extraction equipment for replacement of parts which develop leaks due to corrosion and necessitate the removal of deposits which accumulate within the equipment. It has been proposed and successfully practised to inhibit such ether-glycol deterioration by the inclusion in the ether-glycol of an amine compound, thereby reducing somewhat the undesirable manifestation of such deterioration. Because of the basic or alkaline characteristics of such amine inhibitors, these materials react with the acidic deterioration products to form amine salts or amides at the temperature conditions utilized for ether-glycol extraction processes, thus, in effect, removing the amine from the system as a non-volatile residue of the solvent composition. The amine inhibitors generally used for the aforesaid processes are relatively costly materials and their consumption in the process represents a substantial economic disadvantage accompanying their use. It has now been found that by employing the invention herein provided the amine may be recovered from the acidic glycol deterioration products combined therewith by treating the contaminated ether-glycol-amine solvent composition with an inorganic alkaline compound in solid form, preferably by adding the inorganic alkaline compound to the ether-glycol solvent during the regeneration step. Another feature of the present process by means of which such recovery may be conveniently made comprises the method of treating the contaminated recycle glycol stream by withdrawing a small portion of the total glycol inventory from the lean, recycle glycol as a slip-stream, thereby continuously treating a portion of the total solvent inventory and by virtue of such continuous treatment, regenerating the entire mass of the solvent composition periodically. The invention herein provided is directed to such method of treating the contaminated ether-glycol-amine mixture, as will be hereinafter more fully explained.

Typical ether-glycols customarily utilized in solvent extraction processes, not only for mixtures of hydrocarbons but of other organic compounds as well, include the so-called poly-glycols (that is, the $\alpha,\omega$-dihydroxy-mono- and poly-oxyalkylene alkanes) containing hydroxyl groups at the terminal positions in the polymer chain as well as ether oxygen atoms between the alkylene units, the ethers thereof corresponding to the alkylated alpha and/or omega hydroxyl groups and the esters of the poly glycols in which the alpha and/or omega hydroxyl groups are esterified with organic acids. In the case of the above-enumerated classes of ether-glycols, an ether oxygen atom appears in the chain of the compound, and they may therefore be generically referred to as ether-glycols, although individual compounds may also contain terminal ether or ester linkages so that both the alpha and omega hydroxyl groups are not free. One of the most useful and readily available classes of ether-glycols employed as extractive solvents in the present process are the members of the ethylene glycol series, including di-ethylene glycol, triethylene glycol, tetraethylene glycol and higher ethylene glycol condensation products, generally containing an average of not more than about 6 oxyethylene units per molecule, the compounds in each instance being the inter-condensation products of ethylene glycol in which dehydration occurs between the hydroxyl groups of adjacent ethylene glycol units. This series of inter-condensation products of ethylene glycol may also be named as the alpha-hydroxy-poly-(oxyethylene)-omega-hydroxy ethanes. Other suitable inter-glycol condensation products include the poly-(oxypropylene) glycols containing from 2, up to about 6 oxypropylene units per molecule, the polymeric trimethylene glycols, the alcohol ethers of said glycols, including the methyl, ethyl, propyl, and butyl ethers and the mono- and di-esters of both the monomeric and poly-glycols, such as the formates, acetates, diacetates and propionates of both the mono- and polyethylene and mono- and polypropylene glycol series. In designating the solvent component of the present process as an ether-glycol, it is intended that such term also designate the aforementioned monomeric glycol ethers, the poly-(oxyalkylene) glycols and the ethers and esters of the terminal hydroxyl groups of these glycols, as well as mixtures thereof. The ether-glycol solvent component may also contain dissolved water in amounts of from about 0.5% to about 20% in order to suitably modify the solvency and selectivity of the ether-glycol as well as to activate the reactants during the subsequent solvent and amine regeneration stages. Although the selection of the particular ether-glycol or mixture thereof utilizable in the present process depends to some extent upon the boiling point and viscosity characteristics of the ether-glycol at the conditions maintained during the process, di-ethylene glycol or a mixture of di-ethylene and di-propylene glycols are generally preferred because of their desirbale solvency and selectivity characteristics, as well as their relatively high boiling points and relatively low viscosity at the usual operating conditions for solvent extraction. The above ether-glycols or mixtures thereof also preferably contain from about 2% to about 15% by weight of the total solvent composition of water.

The component of the present solvent extractant referred to herein as an organic amine is selected from the general class of compounds characterized as organic bases containing 1 or more amino groups attached to hydrocarbon or alkanol groups. The preferred organic amines utilizable in the solvent composition are compounds having a relatively low vapor pressure, such that the liquid extractant may be subjected to relatively high temperatures for regeneration of the extractant in the subsequent stages of the process. Suitable organic amines for use in the solvent composition of the present process may be selected from the aliphatic, aromatic, naphthenic, and heterocyclic amines generally, as well as the alkanol amines containing one or more amino and/or hydroxyl group per molecule. The amine may also be a primary, secondary or tertiary amine, the polyamines, the alkanol-amines and the higher molecular weight amines being particularly preferred for use in the present process. Typical useful primary amines include such specific compounds as n-propylamine, isopropylamine, n-butylamine, sec-butylamine, tert-butylamine, one or more of the isomeric amylamines and cyclopentyl and alkylcyclopentyl-amines, n-hexylamine, cyclohexylamine, methylcyclohexylamine, ethyl-cyclohexylamine, propylcyclohexyl-amine, aniline and homologs of the above, preferably containing from 6 to about 16 carbon atoms per molecule. Typical specific secondary amines utilizable as the amine component of the present solvent composition include such compounds as dipropylamine, diisopropylamine, iso-propyl-n-propylamine, n-butylmethylamine, n-butyliso-propylamine, sec-butylmethylamine, sec-butyl-tert-butyl-amine, di-isobutylamine, di-n-hexylamine, di-cyclohexyl-amine, propylnonylamine, dioctylamine, tolylisopropyl-amine, N-monomethyl aniline, morpholine, and homologs and analogs thereof. Typical specific tertiary amines utilizable in the solvent composition include such compounds as tri-ethylamine, tri-n-propylamine, isobutyl-di-propylamine, the various tri-butylamines, tri-amylamines, butylamines, and other homologs including the tri-alkylamines containing up to 20 carbon atoms per molecule. The tertiary amine compound useful herein may also be selected from the aromatic-substituted amino compounds such as N,N-di-ethylaniline, N,N-di-methylaniline, and the heterocyclic tertiary amines such as N-isopropyl piperidine, N,N'-di-methyl piperazine, pyridine, picoline, lutidine, quinoline, etc. One of the referred classes of amino compounds for inclusion in the present solvent-extractant composition to inhibit the deterioration of the ether-glycol component of the composition are the basic primary-secondary amines of the type characterized as polyalkylene poly-amines, such as di-ethylene triamine, tetra-ethylene penta-amine and other polyalkylene polyamines. Another preferred class of amines available for use in the solvent composition are the alkanol amines such as ethanol amine, propanol amine, isopropanol amine, n-butanol amine, di-ethanol amine, triethanol amine, dipropanol amine, and others of this class. The amino component of the present solvent extractant composition is preferably present therein in amounts of from about 0.01% to about 10% by weight of the solvent composition, preferably in amounts of from about 0.05% to about 5% by weight of the composition, although greater or lesser amounts of amine may be present, as desired. Such amine alkalyzing agents have an advantage over inorganic alkalyzing agents in that, because of the vapor pressure of the amine, it penetrates into every portion of the equipment which is exposed to glycol vapors or the vapors of acidic glycol oxidation and/or decomposition products, so that the equipment is protected from corrosion of those parts exposed only to vapors as well as of those parts wetted by the liquid phase.

The process of the present invention and certain factors involved in its operation are further explained in the description of the accompanying diagram which illustrates in its simplest form a solvent extraction process for countercurrently contacting a liquid hydrocarbon feed stock with an ether-glycol and amine mixture utilized as solvent therein, including a stripping stage in which the dissolved hydrocarbon component is distilled from the solvent composition and the lean glycol solvent residue is recycled to the extraction stage and a glycol regeneration stage wherein a slip-stream of the recycle lean solvent is subjected to the action of an inorganic alkaline compound introduced into the ether-glycol regenerator. For economic reasons, the extraction stage is generally operated at an elevated temperature with respect to its surroundings at atmospheric temperature and at atmospheric or superatmospheric pressures sufficient to maintain the charge stock in substantially liquid phase condition, while the stripper is operated by heating the rich solvent stream to temperatures sufficient to vaporize the extract therefrom. Referring to the accompanying diagram, liquid hydrocarbon feed stock is fed into extraction zone 1, generally a vertical tower containing a packing material or other suitable means for obtaining intimate contact between the liquid feed stock and liquid extractant, through line 2 in amounts controlled by valve 3, the hydrocarbon feed stock, which is generally the phase of least density, being generally admitted into the extraction tower in the lower portion thereof. The ether-glycol containing the desired amount of water to control the selectivity and solubility relationships between the solvent and feed stock components within the extraction column and generally derived in major amounts from recycle glycol is admitted into extraction column 1, generally in the upper portion thereof, through line 4, the glycol flowing downwardly against the rising stream of hydrocarbons comprising the feed stock charged into the lower portion of the column. The hydrocarbon or other components of the feed stock which remain undissolved in the solvent are removed as raffinate from the top of the extraction column through line 5 and valve 6 to storage or other uses not related to the present process. The relatively more dense solvent phase containing the desired extracted hydrocarbon component of the feed stock gravitates toward the bottom of the extraction zone and may be removed therefrom through line 7 at a rate controlled by valve 8. The rich solvent containing one or more extracted hydrocarbons is transferred from line 8 by means of pump 9 into line 10 which leads into stripping zone 11, generally a well insulated distillation tower containing means for introducing additional heat therein, for example by means of reboiler coil 12. The rich solvent may be introduced into the stripping zone at any point, although preferably it is charged into the upper portion of the latter zone while the stripped or lean solvent is removed from the lower portion of the stripping zone. The extracted components are removed overhead from the stripping zone through line 13 and valve 14 together with stripping steam, condensed in condenser 14a, and collected in a receiver 15a, from which extracted hydrocarbons are removed through line 16a and valve 17a and the lower water phase is recycled via line 18a, through valve 19a, to the stripper for further stripping action, the hydrocarbons removed through line 16a being transferred to storage or to auxiliary equipment for the treatment of the extract. Part of the extract may be recycled (by means not shown) to the extraction column as reflux, being preferably introduced at a point above the rich solvent take-off but below the feed stock inlet, as, for example, thru line 2a in amounts controlled by valve 3a. As indicated, the solvent composition residue accumulates in the lower portion of the stripping zone and because of the introduction of heat through reboiler 12, it has been the general experience of the art in the absence of an inhibitor of the type provided herein, that the ether-glycol normally undergoes decomposition due to the temperatures required in the reboiling section of the column to strip the extract therefrom and as a consequence thereof, rapid corrosion of the equipment comprising the stripping column normally take place in the absence of the organic amine inhibitor. As a result of the tendency of the ether-glycol to undergo oxidative deterioration giving rise to the formation of acidic glycol deterioration products, such as glycolic acid, acetic acid, and other organic acids, the amine combines with these acidic materials to form amine salts or amides which are non-corrosive or substantially so. The stripped solvent, therefore, accumulating in the lower portion of zone 11 contains not only gummy materials which comprise some of the ether-glycol deterioration products but also the aforementioned amine salts and acid amides formed during the extracting and/or stripping stages which in the absence of a solvent regeneration stage would tend to accumulate in the solvent and would be continuously recycled to the extractor, dissolved in the solvent. The solvent composition, after being stripped in zone 11, is pumped from the bottom of the latter stripping zone through line 15 and valve 16 by means of pump 17 into line 18 which may contain a heater or cooler such as heat exchanger 19 for adjusting the temperature of the solvent to the level desired for solvent extraction, the recycle solvent thereafter being conveyed by means of line 4 containing valve 20 into the top of extraction column 1, as aforesaid. As the solvent is recycled to the extractor, the amine inhibitor is introduced into the recycle solvent stream from storage or from recycle sources, as hereinafter described, through line 21 in controlled amounts determined by valve 22, said line 21 connecting with the solvent feed line 4.

Instead of permitting the solvent degradation products formed by deterioration of the solvent to accumulate in the system, it is preferred and it is one of the essential features of the present process that a regulated quantity or proportion of the recycle solvent stream generally representing from 1 to about 20 percent per day of the inventory of the solvent in the recycle system, and preferably from about 5 percent to about 10 percent of said inventory per day, is continuously withdrawn from line 4 as a so-called slip-stream through line 23 and valve 24 and charged into column 25 for regeneration of not only the amine but also the ether-glycol component of the solvent composition by removal of non-volatile condensation products therefrom. The desired regeneration of the solvent and amine is effected in the present process by charging the slip-stream into a distillation zone operated at a pressure and temperature suitable for distillation of both the ether-glycol solvent component and the amine from the slip-stream and containing a liquid reservoir therein, preferably in the reboiling section of the column, wherein an inorganic alkaline compound comprising the present regeneration agent is contacted with the liquid solvent composition to effect an ionic reaction between the alkaline compound and the amides and the amine salts of the acidic ether-glycol deterioration products. Regeneration zone 25 is suitably a column corresponding in general form to a typical distillation apparatus containing a reboiler coil 26 in the lower portion thereof wherein the liquid phase accumulating in the lower portion thereof may be heated to a temperature sufficient to vaporize the ether-glycol, generally the component of the solvent composition having the greatest boiling point. Regeneration zone 25 may be operated at atmospheric or at a subatmospheric pressure, depending upon the boiling point of the ether-glycol and the decomposition temperatures of the solvent components, and is preferably a vacuum distillation column operating, for example, at pressures of from about 1 to about 100 mm. Hg pressure absolute. By operating at such subatmospheric pressures, the normal boiling point of the glycol is substantially lowered, thus reducing the tendency for further decomposition of the glycol and other components by virtue of high reboiler temperatures. The slip-stream of lean solvent extractant containing the aforementioned contaminants, introduced into the upper portion of column 25 flows downwardly through the regeneration zone which may contain a suitable packing material such as quartz chips, Berl saddles or other vapor-liquid contacting means, including bubble caps and trays, and eventually accumulates as a liquid bottoms comprising unvaporized ether-glycol, the amides and amine salts of the acidic deterioration products of the ether-glycols, and the relatively non-volatile gummy or tarry by-products of ether-glycol deterioration. In accordance with the process of the present invention, an inorganic alkaline compound, such as lime, calcium carbonate, trisodium phosphate, potassium hydroxide, potassium carbonate, sodium hydroxide, sodium acetate or the alkali salts of higher fatty acids, potassium bicarbonate, potassium phosphate, dipotassium acid phosphate, lithium hydroxide, lithium carbonate, lithium acetate, dilithium phosphate, sodium tri-poly-phosphate, sodium borate, sodium silicate, or other inorganic alkaline agent is introduced into the liquid phase present in the regeneration zone 25, preferably into the reboiling section of column 25 through line 27 in amounts controlled by valve 28 to react in stoichiometric ratio with the amine salts present in the liquid glycol phase accumulating within the regeneration column. The inorganic alkaline compound which reacts in accordance with an ionic mechanism with the amine salts and amides of the acidic glycol deterioration products may be introduced either in the solid state or preferably as a concentrated aqueous solution through said line 27. The ionic reaction which takes place within the liquid glycol phase is believed to release the amine from its amide or ammonium neutralization salts with the acids of the glycol deterioration products, yielding the regenerated amine initially charged which is vaporized in the regeneration zone, together with ether-glycol distillate vapors, both vapors being removed from zone 25 through line 29 and valve 30 and passed into condenser 31. A liquid condensate comprising the liquefied vapors of ether-glycol and amine is removed from the condenser through line 32 and valve 33 and discharged into condensate accumulator 34, from which the condensate is removed through line 35 and valve 36 by means of pump 37 and charged into return line 38 connecting with line 21 which returns the regenerated solvent to the glycol recycle line 4 for reuse in the extraction zone. The liquid or semi-solid residue accumulating in the reboiling section of regeneration zone 25, from which all or a major proportion of the amine and ether-glycol components of the solvent have been removed by vaporization therefrom and including the gummy or tarry deterioration products of the ether-glycol as well as the salts formed by reaction of the inorganic alkaline compound with the acidic ether-glycol deterioration products is withdrawn from regeneration zone 25 through line 39 and valve 40 and discharged from the system. The amount so withdrawn may vary from about 0.1 to about 5 percent or even more of the solvent charged to the regenerator, depending upon the state of degradation of the solvent and whether the regenerator is employed continuously or intermittently. When it is employed continuously, removal of 1 to 2 percent of the regenerator charge as bottoms is generally sufficient to assure a regenerated solvent of excellent quality.

Under the preferred conditions of operating the present process the slip-stream of recycle glycol is withdrawn from the recycle line at a rate such that the entire inventory of the solvent composition is regenerated every 150 to 2000 hours, although this rate may be varied within relatively broad limits depending upon the rate of ether-glycol deterioration and the efficiency of maintaining the alkalinity of the glycol at the desired level.

Certain specific embodiments of the present invention and particular methods of operating the present process are further illustrated in the following examples, which, however, are introduced merely for purposes for exemplifying the process and the conditions under which it is operated, rather than as an indication of the scope of the present invention.

In a solvent extraction process utilizing a diethylene glycol solvent containing 7% by weight of water and 0.10% by weight of monoethanol amine for the recovery of aromatic hydrocarbons from a hydrocarbon mixture containing the same and paraffinic hydrocarbons, effecting the extraction at a temperature of about 120° C. and at a presure of 100 p.s.i., stripping the extract phase at said temperature but by stepwise reduction in pressure to recover the extracted aromatic hydrocarbons therefrom, and regeneration of the glycol solvent by vacuum distillation at 40 mm. Hg pressure, the recirculated glycol solvent was maintained at a pH of 8 to 9 for over 400 hours without any corrosion of the steel equipment in which the extraction was effected, although approximately 0.1% of the inventory of solvent was lost from the system during solvent regeneration per day of operation, the loss being occasioned by the removal of tarry deposits and resinous high boiling tars from the bottom of the regeneration zone. It was essential during this operation to continuously add monoethanol amine to the recirculating glycol at the rate of 0.02% of the solvent inventory per day to maintain the pH of the glycol within the above-indicated range. When the procedure of the above process of separation was modified by injecting a concentrated dipotassium phosphate solution into the reboiling section of the glycol regenerator at a rate equivalent to react stoichiometrically with the theoretical concentration of monoethanol amine in the slip-stream of glycol to release a stoichiometric equivalent of said amine therefrom, the glycol in the regenerator reboiler was found to have a pH of 11.3 to 11.6 during a 400 hour test run, and the nitrogen content of the circulating glycol remained substantially constant during this period, so that it was necessary to add monoethanolamine at the rate of only 0.002% of the solvent inventory per day to maintain the circulating glycol at a pH of 8 to 9. During this test period, the residue removed from the bottom of the regeneration zone contained only a trace of nitrogenous material, as indicated by analysis therefor for nitrogen. In this test, the rate of removing the slip-stream of glycol solvent for regeneration was such that the entire inventory of glycol was continuously regenerated about once every 250 hours.

In other experiments we have found that addition of the inorganic alkaline material to the regenerator at a rate such that the pH of the solvent therein is maintained above about 9.5, and preferably in the range 10.5 to 12, is adequate to effect satisfactory amine liberation and provides a convenient method for regulating the addition of inorganic alkalyzing agent.

We claim as our invention:

1. In a continuous solvent extraction process wherein a solvent composition is utilized in the extraction zone comprising an ether-glycol stabilized against deterioration by the presence of an amino compound dissolved therein, dissolved extract is distilled from the resulting rich solvent stream and the resulting lean solvent composition is recycled to the extraction zone, the improvement in said process which comprises continuously withdrawing from the lean solvent recycle a slip-stream of said lean solvent composition, distilling said slip-stream in the presence of an inorganic alkaline compound and vaporizing amine and ether-glycol therefrom, condensing the resulting ether-glycol and amine vapors and combining the resultant condensate with said recycle solvent stream charged into the said extraction zone.

2. The process of claim 1 further characterized in that said inorganic alkaline compound is a potassium phosphate.

3. The process of claim 1 further characterized in that said slip-stream is distilled at a subatmospheric pressure sufficient to vaporize said ether-glycol and said amine from the recycle solvent composition.

4. The process of claim 1 further characterized in that the rate of withdrawing said slip-stream from said recycle stream is equal to from about 1 to about 20 percent per day of the total inventory of said recycle solvent stream.

5. The process of claim 1 further characterized in that said ether-glycol solvent component is diethylene glycol.

6. The process of claim 1 further characterized in that said amine is an alkanol amine.

7. The process of claim 6 further characterized in that said ether-glycol solvent component is diethylene glycol.

8. The proces of claim 6 further characterized in that said alkanol amine is monoethanolamine.

(References on following page)

References Cited in the file of this patent

UNITED STATES PATENTS

| | | | |
|---|---|---|---|
| Re. 22,811 | Scarth | Nov. 12, | 1946 |
| 2,146,201 | Coltof | Feb. 7, | 1939 |
| 2,215,915 | Cope | Sept. 24, | 1940 |
| 2,382,698 | Donlan | Aug. 14, | 1945 |
| 2,418,047 | Parkes et al. | Mar. 25, | 1947 |
| 2,676,911 | Nicolaisen | Apr. 27, | 1954 |
| 2,730,558 | Gerhold | Jan. 10, | 1956 |
| 2,741,578 | McKinnis | Apr. 10, | 1956 |
| 2,797,188 | Taylor et al. | June 25, | 1957 |